Figures 1, 2:
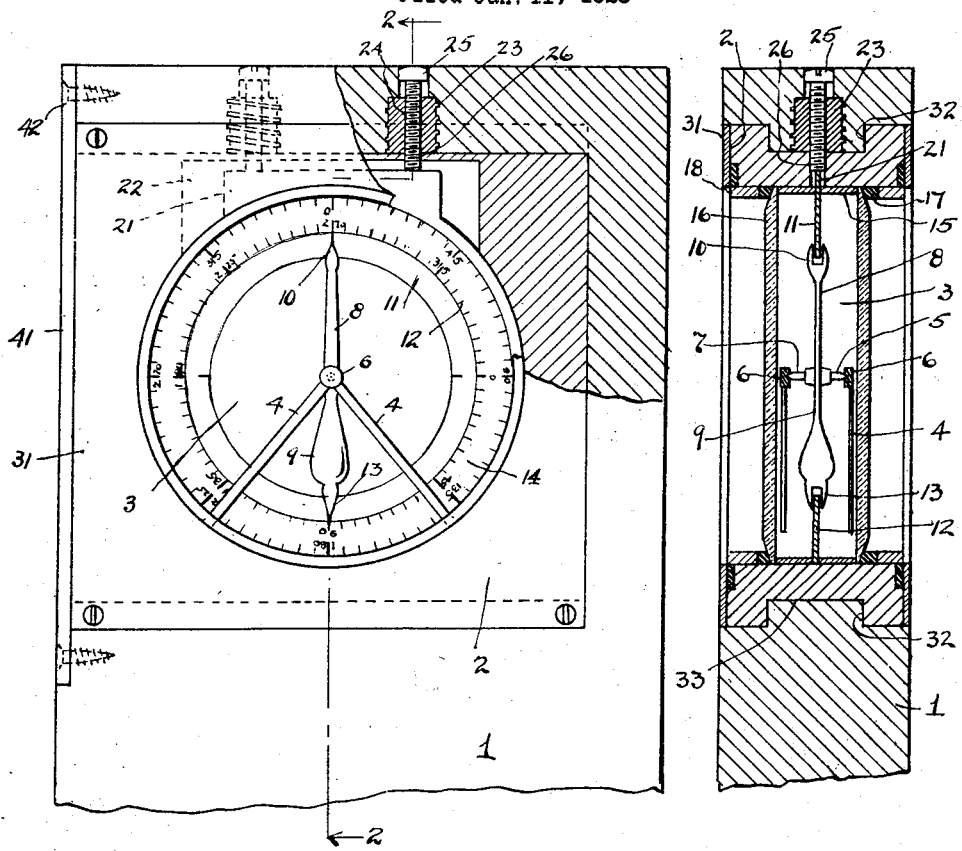

Jan. 3, 1928.  1,654,964
H. CRUMBACH ET AL
PENDULUM LEVEL
Filed Jan. 11, 1923

INVENTORS
Hubert Crumbach and
BY Herbert C. Maxwell
Fay, Oberlin & Fay
ATTORNEYS Patented Jan. 3, 1928.

1,654,964

UNITED STATES PATENT OFFICE.

HUBERT CRUMBACH AND HERBERT C. MAXWELL, OF CLEVELAND, OHIO.

PENDULUM LEVEL.

Application filed January 11, 1923. Serial No. 611,938.

This invention relates to an improved level for the use of carpenters and engineers. More particularly it comprises a level wherein the indicator is not the usual air bubble but instead a pointer arm formed on a pendulum and accurately adjustable to give the proper readings upon a scale to note the degree of inclination of the object being tested.

The level is particularly designed to withstand rough usage and to be capable of adjustment in several different types of measuring instruments so that a single level may be used with a short bar or try-square and may also be placed in position in an extended beam for work over a considerable distance. The level is also intended to supply accurate information as to the amount of inclination of the object measured, both in degrees indicating the angle and in inches per foot or some similar scale such as is frequently used by carpenters. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Fig. 1 is a side elevation of the improved level shown partially in section; and Fig. 2 is a transverse sectional elevation of the improved level taken along the line 2—2 shown in Fig. 1 looking in the direction of the arrows.

As is clearly shown in the drawing, the level 1 comprises a supporting block 2, provided centrally with a built-up casing 3, within which is located a pair of inverted V-shaped brackets 4 carrying at their apexes the pivot elements for the transverse pivot bar 5 of the pendulum. These pivot elements are preferably jewel bearings 6 such as are used in watches, compasses and similar apparatus, and are provided with bearing recesses to receive the conical terminals 7 of the central pivot pin of the pendulum. The pendulum comprises a pointer arm 8 and a weight 9. The pointer arm terminates in a bifurcated indicating means 10 adapted to embrace between these ends an annular scale plate 11 upon each side of which is accurately marked a series of spaced lines forming a scale 12 with readings in degrees, as well as inches of inclination per foot, or other units of measurement, as may be found desirable. A similar bifurcated indicator 13 is attached to the weighted end of the pendulum thus providing a double reading upon the scale, and permitting the accuracy of the instrument to be checked at all times. The annular scale is supported within a circular opening 14 in the supporting block of the level and is held in a central position therein by means of two flat rings 15, which are adapted to seat on opposite sides of said scale. In each of said rings one of the inverted V-shaped brackets is mounted by having its lower ends firmly secured thereto, by soldering or in any preferred manner. Against the outer edges of each of said rings, a glass plate 16 is adapted to be positioned, being held therein by means of suitable flanges 17, 18.

The scale is preferably a metal plate of substantial thickness and is provided upon one edge with an extension flange 21 terminating in a straight edge. The body of the level is provided with a recess 22 to properly receive the extension edge and permit a certain degree of motion thereof about the center of the level as a pivot. A pair of lugs 23 is secured within the body of the level immediately above the straight edge of the flange on the annular scale and each of the lugs is provided with a screw-threaded aperture 24 in which is engaged an adjusting screw 25, the lower end of which passes through suitable openings 26 in the supporting block and bears against the adjacent end of the straight edge of said scale. By this means it is possible to shift the scale any minute degree required to insure an extremely accurate reading. It likewise permits the attachment of the instrument to various measuring devices and its ready and accurate adjustment after such transferring of the level. Through the engagement of the adjusting screws in the apertures 26, the supporting block is held in position.

In order to provide a furnished surface for the instrument it is desirable to attach a pair of metal plates 31 of square outline to each side of the measuring instrument adjacent the point of attachment of the level. These plates are provided with central circular openings of approximately the size of the circular glass plates of the indicating device.

As is clearly shown in Fig. 2 of the drawing, the supporting block is preferably formed upon two of its sides with a central groove 32 adapted to receive a corresponding rib 33 formed on the inner sides of the opening in the body of the instrument to which the level is designed to be applied. Thus, a series of various types of devices may be provided with suitable openings adapted to interengage with the grooves upon the supporting block whereby the ready application of the level to the desired instrument may be easily accomplished. A suitable plate 41 is provided to lock the level in position after it has been inserted into the supporting block, said plate being held in position by means of screws 42 or other suitable fastening elements.

It will be noted that prior to removing the level from one supporting block for placing it within another, it will be necessary to relieve the contact of the adjusting screws from the extension edge of the scale, as well as to withdraw them a sufficient distance to clear their lower ends from the supporting block. After the level has been placed in the new position, the adjusting screws provided upon the new instrument are brought into contact with the straight edge of the scale which should then be accurately adjusted prior to using the instrument.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:—

1. In an apparatus of the character described, a measuring instrument provided with a rectangular opening formed at one edge thereof, projecting ribs formed upon the sides of said opening, a supporting block of rectangular outline, having recesses upon opposite sides adapted to engage said ribs, and having a circular opening centrally thereof, an annular scale plate positioned within said opening, an extension flange upon said scale plate, means mounted in the body of said measuring instrument cooperating with said extension flange for rotating said scale plate in either direction, said means also being adapted to lock said rectangular block within said opening, a pendulum indicator pivoted centrally of said opening, and a pointer formed at either end of said indicator and cooperating with the scale of said scale plate.

2. In an apparatus of the character described, a measuring instrument provided with a rectangular opening formed at one edge thereof, projecting ribs formed upon the sides of said opening, a supporting block of rectangular outline having recesses upon opposite sides adapted to engage said ribs, and having a circular opening centrally thereof, an annular scale plate positioned within said opening, an extension flange, means mounted in the body of said measuring instrument cooperating with said flange for rotating said scale plate in either direction, said means also locking said rectangular block within said opening, a support, a pendulum indicator pivotally mounted on said support centrally of said opening, a pointer provided upon each end of said indicator and cooperating with said scale plate, and a plate secured across the opening of said instrument to retain said supporting block in position.

3. In an apparatus of the character described, a measuring instrument provided with a rectangular opening formed at one edge thereof, projecting ribs formed upon the sides of said opening, a supporting block or rectangular outline, having recesses upon opposite sides adapted to engage said ribs, and having a circular opening centrally thereof, an annular scale plate positioned within said opening, an extension flange, means mounted in the body of said measuring instrument cooperating with said flange for rotating said scale plate in either direction, said means also locking said rectangular block within said opening, a support, a pendulum indicator pivotally mounted on said support centrally of said opening, a pointer provided on each end of said indicator, and a plate secured across the opening in said instrument to serve as additional means for retaining said rectangular block in position.

Signed by us, this 6th day of January, 1923.

HUBERT CRUMBACH.
HERBERT C. MAXWELL.